3,689,275
DETOXIFICATION OF OILSEED MEAL WITH CALCIUM HYDROXIDE
Henry Marti Espoy, Seal Beach, Calif., assignor to Daylin Laboratories, Inc., Los Angeles, Calif.
No Drawing. Filed June 22, 1970, Ser. No. 48,433
Int. Cl. A23k 1/00; A23l 1/20
U.S. Cl. 99—2 E                                                            7 Claims

ABSTRACT OF THE DISCLOSURE

The method is directed towards the detoxification of copra, cottonseed meal, peanut meal, and other products, from aflatoxins by adding to the various meals a slurry consisting of calcium hydroxide in water, in which the mean particle size of the particulates is below 50 microns. In certain instances concerning copra, cottonseed meal, peanut meal, etc., from which the oil has been removed, it is necessary to add a binding agent such as sodium lignin sulfonate and to pellet the material using heat and pressure. In both cases, the meal must then be heated to a temperature of 50° C. or more and this temperature must be maintained from 1 to 60 minutes or longer.

---

Many oilseed meals such as cottonseed meal, peanut meal, soya meal, sesame meal, safflower meal, copra, etc. have been found to contain aflatoxins or mycotoxins due to the growth of certain fungi. Detoxification has been attempted in the past using acids such as acetic acid, acetic anhydride, ascorbic acid, formic acid, fumaric acid, glycolic acid, maleic acid, maleic anhydride, nitric acid, phosphoric acid, and succinic anhydride. A number of oxidizing agents have also been utilized such as ammonium persulfate, hydrogen peroxide, potassium chlorate, sodium bromite, sodium hypochlorite and sodium perborate to which sodium hydroxide was added. Alkaline materials have been utilized which include sodium hydroxide, sodium carbonate, calcium hydroxide, magnesium hydroxide, and trisodium phosphate. To the present time the most successful results have been made by treating the aflatoxin containing meals with ammonia. This treatment however requires high pressure and adequate equipment which is not available in most seed and oil processing plants.

The applicant realizes that the present methods of employing calcium hydroxide are not successful in that erratic results are secured (G. E. Mann et al., J. Am. Oil Chemists' Society, volume 47: pp. 174, column 2, lines 45 to 50 of text). The method used is the normal method of procedure, lines 33 to 40 of same column, in which the meal is adjusted to 15–30% moisture depending on the type of the meal concerned and the alkaline material added at the level of 2%.

The applicant had secured similar results in his experiments and practical trials when it occurred suddenly to him that the reason for the erratic results might be in the size of the particles of the alkaline materials, herein calcium hydroxide, and in whether the surface of the particles were wetted with water, also in the method of application of the chemicals to the meals.

The applicant used calcium hydroxide in the form of a water slurry having mean particle diameters of 50 microns or less and added this slurry to dry copra meal. The mixture was then put through a mill to achieve mixing and the resulting product was then compressed under pressure to the form of a cake, at the same time applying heat so that the meal was heated to a temperature of 200° F. The material was then cooled and tested for aflatoxins. However, none was detected in the final product even though the original copra meal contained 105 p.p.b. aflatoxin $B_1$. The experiment was then repeated using the same contaminated copra meal on a larger scale, using a pellet mill as a method of compression and heating. In addition to the calcium hydroxide, a binding agent, sodium lignin sulfonate, was included in the usual amounts. No external source of heat was used other than employed for the pelleting itself. The hot pellets discharged from the machine were held in a bin for 30 minutes and then transferred to the pellet cooler. Again no aflatoxins were found in the finished pellets. The same procedure was used on a contaminated cottonseed meal made by the solvent extraction process and which contained a total of 35 p.p.b. aflatoxins $B_1$ and $B_2$. The quantities used are shown in Table 1.

TABLE 1

|  | Lbs. |
|---|---|
| Cottonseed meal | 100 |
| Sodium lignin sulfonate | 2 |
| Calcium hydroxide slurry (25% calcium hydroxide) | 16 |

The calcium hydroxide was prepared in the form of a slurry containing 40% calcium hydroxide and with the mean particle size less than 50 micron.

Such a slurry can be held for periods of time without excessive settling. Portions of this concentrate were then mixed with the lignin sulfonate and additional water. This material was mixed uniformly so all particles of meal were contacted after which the mixture was then pelleted. At pelleting there was a moisture content of approximately 12%. No aflatoxin was detected after the material was pelleted.

TABLE 2

|  | Lbs. |
|---|---|
| Cottonseed meal, expeller process (aflatoxin 425 p.p.b.) | 100 |
| Orzan | 1 |
| 20% $Ca(OH)_2$ slurry, 50 micron diameter and less | 16 |

This material was mixed uniformly as in Table 1 at which point it was approximately 10 percent moisture. It was pelleted as before and again the aflatoxin had been reduced this time to 12 parts per billion. A portion of the pellets were held at 205° F. for 15 minutes after which time no aflatoxin could be detected.

TABLE 3

|  | Lbs. |
|---|---|
| Copra meal, 2% moisture (80 p.p.b. aflatoxin) | 100 |
| Orzan | 15 |
| 30% $Ca(OH)_2$ slurry, 50 micron diameter and less | 10 |

Again the slurry was mixed with the copra meal and pelleted as before. The reduction with no additional holding time was to 10 parts per billion, at 15 minutes a trace was present which was read as 3 parts per billion and at 30 minutes the aflatoxin content was zero.

TABLES 4 AND 5

Two samples of pellets were made up using reagent grade $Ca(OH)_2$ in which the particle size ranges from 100 micron to 250 microns. The "Orzan" was mixed with the water and this then mixed with the meal. The dry calcium hydroxide was then added and mixed vigorously as in the other instances.

TABLE 4

|  | Lbs. |
|---|---|
| Cottonseed meal, 4% moisture (aflatoxin 425 p.p.b.) | 100 |
| Water | 15 |
| Orzan | 2 |
| $Ca(OH)_2$ powder | 3.2 |

TABLE 5

| | |
|---|---|
| Copra meal, 2% moisture (80 p.p.b.) aflatoxin) | 100 |
| Water | 25 |
| Orzan | 2 |
| $Ca(OH)_2$ powder | 3.2 |

Both of the above were pelleted. In no case was the decrease more than 55% over the original aflatoxin in content. This indicates that the particle size and method of application of the $Ca(OH)_2$ are the important factors in detoxification of aflatoxin and it is this protection that the inventor desires. The discovery that detoxification of aflatoxin resulted from an intimate mixture with small particles of $Ca(OH)_2$ and the heat occurring during pelleting led the applicant to wonder if the intimate mixture of small particle size $Ca(OH)_2$ as a slurry with the various meals containing aflatoxin would detoxify these with no binder present or no pelleting operation being utilized.

TABLE 6

| | Lbs. |
|---|---|
| Cottonseed meal (120 p.p.b. aflatoxin) | 100 |
| 40% slurry $Ca(OH)_2$ less than 50 micron size | 8 |

The above slurry was intimately mixed with the cottonseed meal and the mixture heated with stirring to insure uniform heat to 80° C. and held for 10 minutes. No aflatoxin could be detected.

TABLE 7

| | Lbs. |
|---|---|
| Copra meal (80 p.p.b. aflatoxin) | 100 |
| 20% slurry $Ca(OH)_2$ less than 50 micron size | 16 |

The above slurry was intimately mixed with the cottonseed meal and the mixture was heated with stirring to insure uniform heat to 75° C. and held at that temperature for 10 minutes. No aflatoxin could be detected.

What is claimed is:

1. A method of detoxification of aflatoxin in an oil seed meal comprising:

(a) admixing with one hundred parts of said meal (wet basis), a slurry consisting of between about twenty to forty percent calcium hydroxide (by weight) in water, in which the mean particle size of said particles of calcium hydroxide is below 50 microns in diameter but not sufficiently below that diameter to form a solution in water, the total water content of said resultant admixture of slurry and meal lying between about 7–23 percent, by weight; and (b) heating said resultant admixture to a temperature of between at least 50° C. and about 95° C. in the presence of said slurry for between 1 to 60 minutes.

2. The method of claim 1 wherein said oil seed meal is selected from the group consisting of cottonseed meal peanut meal, soya meal, sesame meal, safflower meal, and copra meal.

3. The method of claim 1 wherein oil is removed from said oil seed meal prior to said admixture of said slurry and said meal.

4. The method of claim 1 wherein said slurry is intimately admixed with said oil seed meal under pressure, for at least a portion of the time that said resultant admixture is being heated.

5. The method of claim 1 wherein said slurry and said meal is intimately admixed with a binding agent.

6. The method of claim 4 wherein said slurry and meal is pelletized after its intimate admixture.

7. The method of claim 5 wherein the oil seed meal is selected from the group consisting of cottonseed meal, peanut meal, soya meal, sesame meal, safflower meal and copra meal.

References Cited

UNITED STATES PATENTS

| | | | |
|---|---|---|---|
| 3,018,280 | 1/1962 | Salzberg et al. | 99—17 |
| 3,035,920 | 5/1962 | Knodt | 99—2 |
| 3,127,388 | 3/1964 | Johnson et al. | 99—14 |
| 2,458,680 | 1/1949 | Buxton | 99—11 |
| 3,481,743 | 12/1969 | King | 99—17 |
| 2,726,155 | 12/1955 | King | 99—2 |
| 2,873,190 | 2/1959 | King | 99—2 |
| 3,440,054 | 4/1969 | Sair | 260—123.5 |
| 3,476,739 | 11/1969 | Liggett | 260—123.5 |
| 3,491,080 | 1/1970 | Ehrensvard et al. | 260—123.5 |

OTHER REFERENCES

J. Pominski et al.: "Note on the Use of $Ca(OH)_2$ in the Preparation of Peanut Protein," J. Amer. Oil Chem. Soc., February 1953, vol. XXX, pp. 88–89.

NORMAN YUDKOFF, Primary Examiner

C. P. RIBANDO, Assistant Examiner

U.S. Cl. X.R.

99—17, 2 R; 260—123.5